(12) United States Patent
Johnson et al.

(10) Patent No.: US 7,603,714 B2
(45) Date of Patent: Oct. 13, 2009

(54) METHOD, SYSTEM AND COMPUTER PROGRAM PRODUCT FOR COMPUTER SYSTEM VULNERABILITY ANALYSIS AND FORTIFICATION

(75) Inventors: David P. Johnson, Cary, NC (US); Neeraj R. Joshi, Morrisville, NC (US); Brent A. Miller, Cary, NC (US); Daniel S. Rabinovitz, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 10/795,776

(22) Filed: Mar. 8, 2004

(65) Prior Publication Data
US 2005/0198527 A1    Sep. 8, 2005

(51) Int. Cl.
*G08B 23/00* (2006.01)
(52) U.S. Cl. .................. 726/25; 726/22; 713/164; 709/223; 709/224
(58) Field of Classification Search ................ 726/25
See application file for complete search history.

(56) References Cited

U.S. PATENT DOCUMENTS

| | | | |
|---|---|---|---|
| 6,418,462 B1 * | 7/2002 | Xu | 709/201 |
| 6,654,783 B1 * | 11/2003 | Hubbard | 709/202 |
| 7,096,503 B1 * | 8/2006 | Magdych et al. | 726/25 |
| 2003/0233581 A1 * | 12/2003 | Reshef et al. | 713/201 |
| 2003/0236994 A1 * | 12/2003 | Cedar et al. | 713/200 |
| 2004/0064722 A1 * | 4/2004 | Neelay et al. | 713/200 |

OTHER PUBLICATIONS

Levitt, J., "Ethical Hacking Made Simple: Satan's Legacy," *Informationweek.com*, http://www.informationweek.com/author/internet44.htm.

* cited by examiner

*Primary Examiner*—Ponnoreay Pich
(74) *Attorney, Agent, or Firm*—Joseph E. Bracken; Law Office of Jim Boice

(57) ABSTRACT

A method, system, and computer program product for the automatic detection and fixing of security vulnerabilities in both individual software components and across complex, multi-component software solutions. The architecture of the software solution to be monitored is analyzed prior to its being monitored. Data derived from the analysis is used to proactively identify possible ways to attack the software solution. The software solution being monitored and the system on which it runs is periodically scanned, and attacks on it are attempted. A list of possible attacks is continuously updated, for example, in a manner similar to virus signatures provided by virus security companies, and a log is generated describing which attacks were successful and which ones failed.

19 Claims, 2 Drawing Sheets

METHOD, SYSTEM AND COMPUTER PROGRAM PRODUCT FOR COMPUTER SYSTEM VULNERABILITY ANALYSIS AND FORTIFICATION

Background of the Invention

1. Field of the Invention

This invention relates to computer security and, more particularly, to vulnerability analysis systems.

2. Description of the Related Art

Many of today's software solutions (programs) are complex applications composed of a large number of components interacting together to solve customer problems. For example, an enterprise software solution may be composed of a number of large components, such as DB2, IBM HTTP Server, WebSphere Application Server, and WebSphere Portal Server. In such a solution, most of the major components are full-scale applications in their own right and cross-component security administration (e.g., the process of making sure all of the entry-points and components of a business system meet mandatory security requirements) is a complex, time-consuming task. For example, applying the latest patches, having secure authentication methods for login, encryption for data communication, etc., especially in environments consisting of multiple interacting platforms, operating systems, and products enforcing the security policies, can be very time consuming and error-prone. New security vulnerabilities are often discovered in the individual components and fixes to them are released by the vendors, but there is no solution for automatic application of the patches to the individual components and to the software solution as a whole.

Current software solutions require manual auditing to ensure that no serious security issues exist. Some security applications (vulnerability analysis systems) do exist that scan software solutions and the systems on which they run for weaknesses (e.g., open TCP/IP ports, etc.) that are typically found in all software solutions/systems. They use generic techniques such as port scanning, packet flooding, and the like to perform what is known as "ethical hacking," that is, attempting to gain access to a system using known vulnerabilities, to see if such vulnerabilities are present in the system under analysis. One example of such a system is SATAN (Security Analysis Tool for Auditing Networks), a free software package released in the 1990's.

With software solutions increasing in size and complexity, it is increasingly difficult to keep up with the task of identifying and fixing security issues manually. These "virtual hackers", while identifying some system weaknesses, are not "creative" in that they rely on generic, known attack methods (such as the previously-mentioned port scanning method) that are based not on the software solutions being analyzed but instead on attacks that have been shown to work on many systems in the past. Further, these systems do not have mechanisms to fix the identified security issues automatically. For example, intrusion detection systems of the prior art detect intrusions and then alert the users as to the need to react to the intrusion. Also, in a complex software solution, even if the individual components of the software solution are secure, it cannot be assumed that the combination of these components is also secure.

Accordingly, it would be desirable to have a system to detect and fix security holes automatically in software solutions before an intrusion occurs, and that can identify vulnerabilities beyond the generic vulnerabilities found by prior art systems, and that can correlate security risks across multiple components in a software solution.

SUMMARY OF THE INVENTION

The present invention is a method, system, and computer program product for the automatic detection and fixing of security vulnerabilities in both individual software components and across complex, multi-component software solutions. In accordance with the present invention, the architecture of the software solution to be monitored is analyzed prior to its being monitored. The present invention uses data derived from the analysis to proactively identify possible ways to attack the software solution. It then periodically scans the software solution being monitored and the system on which it runs, and attempts attacks on it. A list of possible attacks is continuously updated, for example, in a manner similar to virus signatures provided by virus security companies, and a log is generated describing which attacks were successful and which ones failed. At the end of each scan it can generate a report that identifies the weaknesses found in the solution. If the weaknesses have a known remedy, then the present invention can apply the remedy automatically (according to the set of rules embodied in a "fix" policy). An administrator is also informed and the event is logged.

In an exemplary embodiment, the present invention comprises a method for detection and correction of security vulnerabilities in a computing environment, comprising: analyzing a software solution to identify legal and illegal external interfaces thereto; attempting to access said software solution using the identified illegal external interfaces; and storing a record of any illegal external interfaces that allow access to said software solution.

DETAILED DESCRIPTION OF THE PREFERRED EMBODIMENTS

Figure 1:
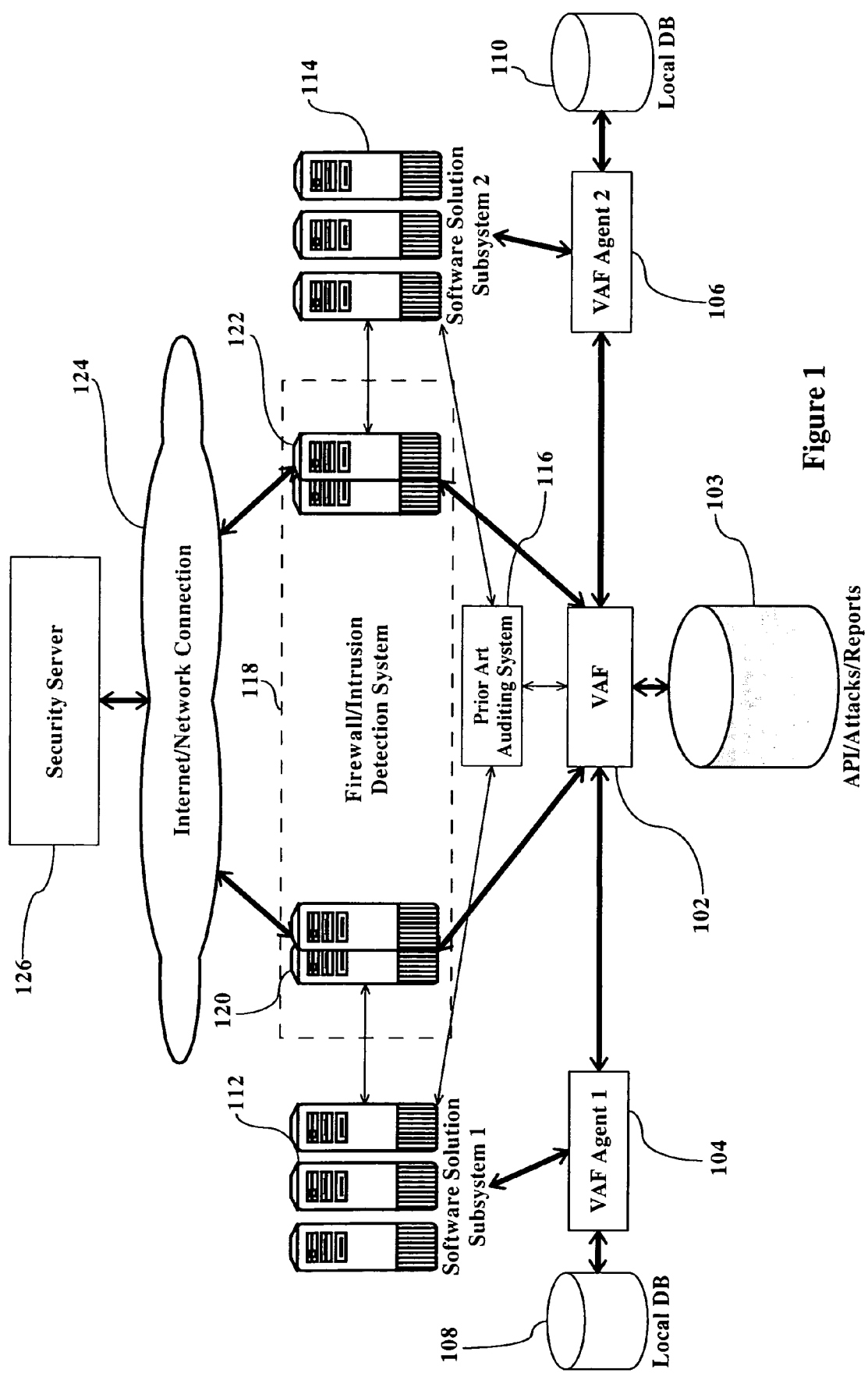
FIG. 1 is a block diagram of the general architecture of the present invention in an environment in which it may be used.

FIG. 1 is a block diagram of the general architecture of the present invention in an environment in which it may be used. Referring to FIG. 1, a vulnerability analysis and fortification tool (VAF) 102 is coupled to an API/attacks/reports repository 103. Repository 103 stores detailed information regarding how to make API calls for the software system(s) under analysis. Repository 103 is central to the operation of VAF 102 and contains XML files (explained in more detail below) that provide all of the information necessary to identify valid (legal) and invalid (illegal) methods for access to a system, and to launch a vulnerability attack on the system and determine when the attack is successful. More particularly, the repository 103 stores information related to what different external API calls (external interfaces) have been exposed by the system, what are the valid arguments and return codes for such calls, and what constitutes a successful and legal method call. This information may include access sequences (password sequences and return codes, preconditions required for access, etc.) for software solutions being monitored by VAF 102.

In a preferred embodiment, for each software solution being monitored, a VAF agent is utilized. For example, a VAF agent 104 monitors software solution 112 and VAF agent 106 monitors software solution 114. Each VAF agent has a local database coupled thereto (local database 108 and local database 110) which is used to store the XML descriptions described above, historical data regarding attacks, and attack patterns that have a high success rate. Separate VAF agents are used because the system to be protected could be a distributed system scattered over many locations. In such cases, a VAF agent performs the security analysis of the subcomponent assigned to it and sends the results over to the VAF 102.

A prior auditing system 116 (e.g., the previously described SATAN system) can be used in conjunction with the VAF 102. In this configuration, the prior art auditing system 116 monitors the system for common, previously-known weaknesses, while the VAF 102 (and its VAF agents) monitors and corrects the system for specific weaknesses identified by the VAF 102.

To keep the VAF up to date with the most current security information, VAF 102 can be coupled to a security server 126 via an Internet connection 124 and a firewall intrusion detection system 118. In a preferred embodiment, there are separate firewall/intrusion detection systems 120 and 122 provided for each software solution being monitored by VAF 102.

Using the system illustrated in FIG. 1, the VAF 102 obtains detailed information regarding the architecture of each software solution being monitored. The VAF obtains knowledge of the external interfaces to a solution (e.g., all mechanisms exposed by the system to communicate with external applications, e.g., APIs, Webservices, HTML forms, etc.) by using an XML description of its interfaces stored in API repository 103. These XML descriptions can be created specifically for use by the VAF and/or can be migrated from other established sources, e.g., existing test harnesses have essentially the same information, although possibly in a form requiring modification to be "understood" by the VAF.

For each interface described, there is a set of preconditions that have to be met before "legal" invocation of the interface, and also a corresponding acceptable return code or codes indicating success or failure to access the interface. Based on the XML description of the interfaces to the software solutions, the VAF creates a directed graph, with the nodes being a state in the system and the edges being method invocations. The graph is simply a graphical representation, somewhat like a map, showing how a system may be legally accessed, as well as helping identify potential methods of illegally accessing the system. Any manner of identifying how a system may be legally accessed will suffice; a directed graph is one example of how it can be done.

Figure 2:
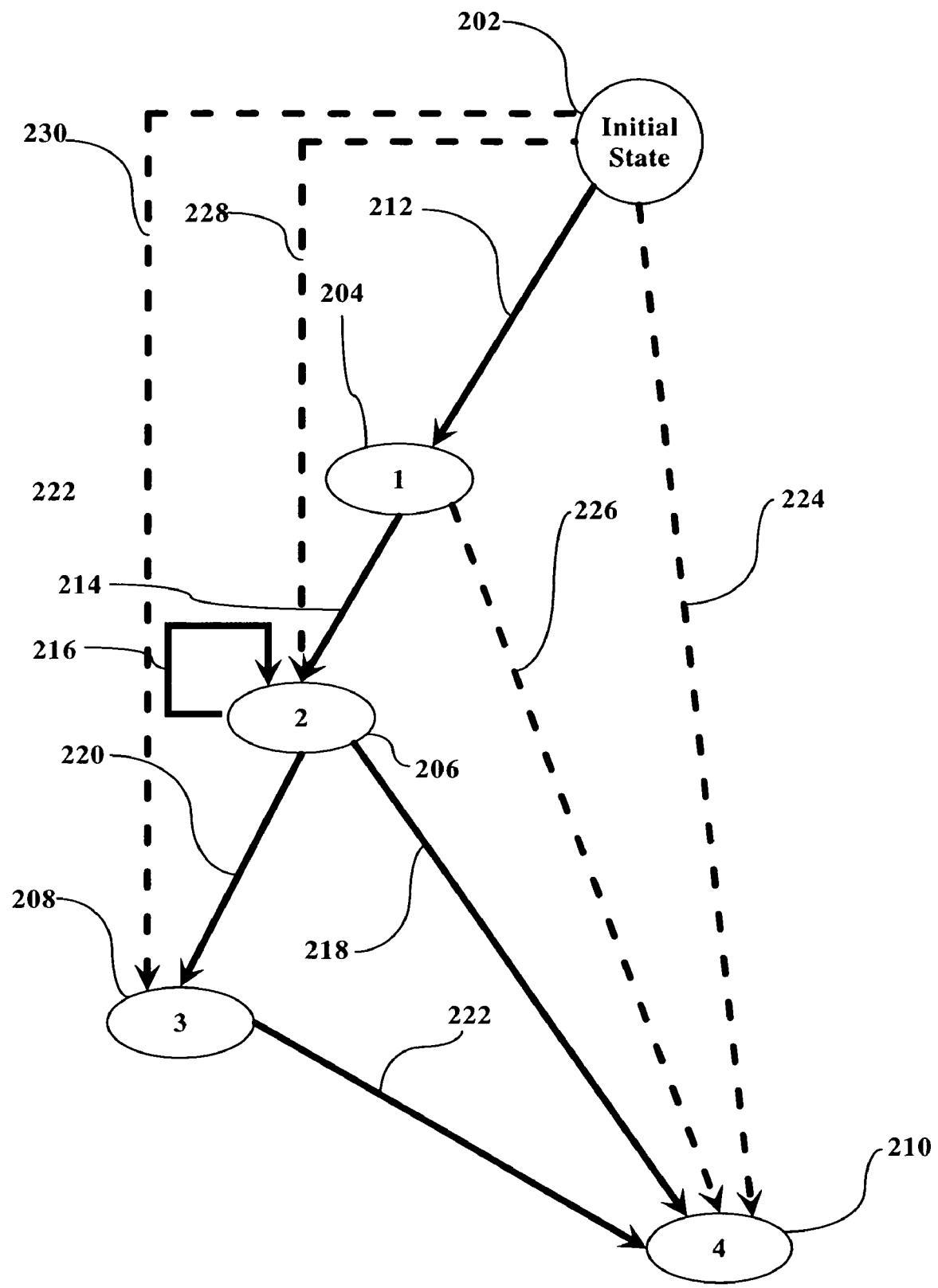
FIG. 2 is an example of a directed graph illustrating an example of a portion of a bank transaction involving the electronic transfer of funds.

An example of such a directed graph is illustrated in FIG. 2, illustrating an example of a portion of a bank transaction involving an electronic transfer of funds. Referring to FIG. 2, nodes are represented by oval shapes and method invocations are indicated by solid arrows connecting the various nodes. For example, referring to FIG. 2, from an initial state 202, a method 212 is invoked to successfully traverse to a first state 204. Method 212 could comprise, for example, a precondition of the input of a valid user ID and password, and the return of a valid return code indicating the receipt of a valid user ID and password, i.e., method 212 could represent a typical logon process for an ATM machine.

From the first state 204, a method 214 could be invoked having as a precondition, first, the execution of method 212 and the return of a valid return code, followed by the submission of a second pass phrase (for additional security) and the return of an additional valid return code (e.g., a token) indicating the receipt of a valid pass phrase.

Once in state 206, multiple options are available. For example, method 216 could be invoked, whereby the user is given the option of changing their password by entering a new password in a new password screen, and the successful return of a valid return code indicating the inputting of a valid new password. Alternatively, or in addition, method 218 can be invoked, whereby the user invokes an immediate request to perform a transfer of funds. Alternatively, the user can first invoke method 220 and obtain an account balance (and enter state 208), followed by a method 222, which is a request to transfer funds.

Each of these valid or "legal" external interfaces with the banking program are illustrated in FIG. 2 by solid arrows connecting to the various nodes. To summarize, the legal sequence of API calls that are required to transfer money from one account to another are as follows:

1. Login using a valid username and password (transition from initial state to state 1);
2. Once logged in, as another level of security, a secret password phrase must be entered (transition from state 1 to state 2);
3. Once in state 2, the initial password can be reset (stay in state 2); the account balance for a particular account can be obtained (states 2-3); or money can be transferred from one account to another (states 2-4).

All other transitions are illegal; for example, a transfer from the initial state to state 210 (illustrated by dotted transition line 224 ), would allow a transfer money between accounts without having logged in, which is an illegal operation. Other illegal transitions are illustrated by dotted transition lines 226, 228, and 230 .

The following is an example of an XML description that describes the API represented by the directed graph of FIG. 2:

```
<?xml version="1.0" encoding="UTF-8"?>
<method name="login" id="1">
    <parameters>
        <param name="username">
        neeraj
        </param>
        <param name="password"
        pwd
        </param>
    </parameters>
    <precondition></precondition>
    <validreturnvalue>
        true
    </validreturnvalue>
</method>
<method name="pwdphrase" id="2">
    <parameters>
        <param name="passphrase">
        abracadabra
        </param>
    </parameters>
    <precondition>
        <method id="1">
            true
        </method>
    </precondition>
</method>
```

In the above XML snippet method "pwdpharse" has a precondition that method login with id=1 should have returned a value=true before pwdphrase can be legally executed. This example illustrates how all of the interfaces of a system can be described in XML, along with the dependencies between them.

The VAF tool of the present invention can also log the presence of known threat patterns along with those that have not yet been identified as security threats. The VAF tool scans the system for vulnerabilities regularly. When it discovers a vulnerability, it does the following. If there is a known remedy (e.g., a "patch") to fix the security hole, that remedy is applied. If no known remedy exists, the administrator is alerted of the vulnerability. Next, the pattern of calls that lead to the discovery of the security hole is logged. This logged history is later used to optimize vulnerability detection based on the pattern of API calls that identify the vulnerability. This newly discovered information is also made available to all other VAF systems to download via security servers. If a new security hole is discovered, the pattern of calls required to breach the security is made available to all the VAF systems. These systems then check whether such a pattern of calls is possible on the specific system that their particular VAF is monitoring and, if possible, alert the administrator or apply the patch (if it is available). Thus, in the future, if these patterns are identified as being vulnerable to attacks, the application would know exactly where the fixes need to be applied.

The VAF of the present invention is superior to other current security solutions, such as an intrusion detection system (IDS), in that it analyzes the software being monitored before monitoring to discover vulnerability, and periodically updates itself with the latest attack techniques and defenses from other sources. It then tries these attacks on systems it is responsible for monitoring. If any attack is successful, and if it has a known solution, VAF automatically applies the fix; otherwise, it alerts the user of its vulnerability, which helps to enable the development of remedies for attacks. These remedies then will be available in the future for automatic application by the VAF.

One advantage of the present invention is that it can be packaged as an add-on component that can be shipped along with an enterprise software solution. Having a protective component added to the solution will improve the solutions marketability. VAF can also be used in conjunction with other automatic computing technologies, such as Common Log and Trace and ABLE, or it can function alone. This allows enterprise customers the maximum flexibility when configuring their computer systems.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of the VAF itself. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method comprising:
generating, by a first vulnerability analysis and fortification (VAF) agent operating in a hardware-based system, a first process representation of a first process, wherein the first process comprises a series of sequential operations that are represented by multiple nodes in the first process representation, and wherein the first VAF agent monitors the first process for security exposures;
defining legal and illegal interfaces between the multiple nodes in the first process representation, wherein a legal interface between a first node and a second node in the first process representation reflects an authorization for operations represented by the first node and the second node to be linked, and wherein an illegal interface reflects a lack of authorization for operations represented by the first node and the second node to ever be directly linked;
generating, by a second VAF agent, a second process representation of a second process;
comparing nodes from the first process representation to nodes of the second process representation, wherein the second VAF agent monitors the second process for security exposures; and
in response to the nodes of the first process representation matching nodes in the second process representation, sending an alert from the first VAF agent to the second VAF agent, wherein the alert identifies the illegal interfaces between nodes in the first process representation as potential illegal interfaces between nodes in the second process representation.

2. The method of claim 1, wherein the legal interface further reflects a requisite action in the first node that is required to reach the second node, and wherein the illegal interface further reflects an absence of the requisite action in the first node.

3. The method of claim 2, wherein the legal interface further reflects a requisite return code being transmitted from the second node to the first node, wherein the requisite return code is transmitted in response to a password being sent from the first node to the second node.

4. The method of claim 1, further comprising:
in response to the first VAF agent detecting the illegal interface, creating, by the first VAF agent, a security patch that prohibits the first node from being linked to the second node; and
transmitting the security patch from the first VAF agent to the second VAF agent.

5. The method of claim 1, wherein the first process and the second process are component part of a single distributed software system.

6. The method of claim 1, wherein the first process representation and the second process representation are respectively derived from an extensible markup language (XML) description of the first process and the second process.

7. The method of claim 6, wherein the XML description of the first process is stored in a security server that is protected by a first firewall detection system, and wherein the XML description of the second process is stored in the security server and is protected by a different second firewall detection system.

8. The method of claim 1, wherein the method described in claim 1 is embodied as an add-on software component, the method further comprising:
adding the add-on software component to an enterprise solution before shipping the enterprise software solution to a customer, wherein the enterprise solution is based on the first process.

9. The method of claim 1, wherein the first VAF agent and the second VAF agent are controlled by a single VAF tool.

10. The method of claim 1, wherein the first process representation and the second process representation are depicted as graphs.

11. A computer program product comprising a computer readable storage medium embodied therewith, the computer readable storage medium comprising:
computer readable program code configured to generate, by a first vulnerability analysis and fortification (VAF) agent operating in a hardware-based system, a first process representation of a first process, wherein the first process comprises a series of operations that are represented by multiple nodes in the first process representation, and wherein the first VAF agent monitors the first process for security exposures;
computer readable program code configured to define legal and illegal interfaces between the multiple nodes in the first process representation, wherein a legal interface between a first node and a second node in the first process representation reflects an authorization for operations represented by the first node and the second node to be linked, and wherein an illegal interface reflects a lack of authorization for operations represented by the first node and the second node to be directly linked;
computer readable program code configured to generate, by a second VAF agent, a second process representation of a second process;
computer readable program code configured to compare nodes from the first process representation to nodes of the second process representation, wherein the second VAF agent monitors the second process for security exposures; and
computer readable program code configured to, in response to the nodes of the first process representation matching nodes in the second process representation, send an alert from the first VAF agent to the second VAF agent, wherein the alert identifies the illegal interfaces between nodes in the first process representation as potential illegal interfaces between nodes in the second process representation.

12. The computer program product of claim 11, wherein the legal interface further reflects a requisite action in the first node that is required to reach the second node, and wherein the illegal interface further reflects an absence of the requisite action in the first node.

13. The computer program product of claim 12, wherein the legal interface further reflects a requisite return code being transmitted from the second node to the first node, wherein the requisite return code is transmitted in response to a password being sent from the first node to the second node.

14. The computer program product of claim 11, wherein the first process and the second process are component parts of a single distributed software system.

15. The computer program product of claim 11, wherein the computer program product is an add-on software component, the computer program product further comprising:
computer readable program code configured to add the add-on software component to an enterprise solution before shipping the enterprise software solution to a customer.

16. The computer program product of claim 11, wherein the first VAF agent and the second VAP agent are controlled by a single VAF tool.

17. A system comprising:
a central processing unit (CPU), a computer readable memory, and a computer readable storage media;
first program instructions for generating, by a first vulnerability analysis and fortification (VAF) agent operating in a hardware-based system, a first process representation of a first process, wherein the first process comprises a series of sequential operations that are represented by multiple nodes in the first process representation, and wherein the first VAF agent monitors the first process for security exposures;
second program instructions for defining legal and illegal interfaces between the multiple nodes in the first process representation, wherein a legal interface between a first node and a second node in the first process representation reflects an authorization for operations represented by the first node and the second node to always be linked, and wherein an illegal interface reflects a lack of authorization for operations represented by the first node and the second node to ever be directly linked;
third program instructions for generating, by a second VAF agent, a second process representation of a second process;
fourth program instructions for comparing nodes from the first process representation to nodes of the second process representation, wherein the second VAF agent monitors the second process for security exposures; and
fifth program instructions for, in response to the nodes of the first process representation matching nodes in the second process representation, sending an alert from the first VAF agent to the second VAF agent, wherein the alert identifies the illegal interfaces between nodes in the first process representation as potential illegal interfaces between nodes in the second process representation, and wherein
said first, second, third, fourth and fifth program instructions are stored on said computer readable storage media for execution by said CPU via said computer readable memory.

18. The system of claim 17, wherein the first process and the second process are component parts of a single distributed software system.

19. The system of claim 17, wherein the first VAF agent and the second VAF agent are controlled by a single VAF tool.

* * * * *

UNITED STATES PATENT AND TRADEMARK OFFICE
CERTIFICATE OF CORRECTION

PATENT NO. : 7,603,714 B2
APPLICATION NO. : 10/795776
DATED : October 13, 2009
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Fifth Day of October, 2010

David J. Kappos
*Director of the United States Patent and Trademark Office*